United States Patent [19]
Bourassin

[11] 3,924,910
[45] Dec. 9, 1975

[54] DAMPENED VERTICAL SPINDLE

[75] Inventor: René Bourassin, Neauphle le Chateau, France

[73] Assignee: Commissariat A l'Energie Atomique, Paris, France

[22] Filed: July 9, 1973

[21] Appl. No.: 377,402

[30] Foreign Application Priority Data
July 13, 1972   France .............................. 72.25549

[52] U.S. Cl. ................ 308/156; 308/36.1; 308/77; 308/145; 308/172
[51] Int. Cl.² .................... F16C 17/10; F16C 33/80; F16C 35/08; F16C 37/00
[58] Field of Search ........ 308/144, 149, 156, 9, 15, 308/76, 77, 110, 145, 146, 147, 148, 168, 172, 240, 36.1

[56] References Cited
UNITED STATES PATENTS

| | | | |
|---|---|---|---|
| 1,432,095 | 10/1922 | Bartholomew ..................... | 308/172 |
| 1,822,817 | 9/1931 | Minet ................................... | 308/168 |
| 2,169,877 | 8/1939 | Linn ..................................... | 308/145 |
| 2,846,600 | 8/1958 | Potter ................................. | 308/77 X |

Primary Examiner—M. Henson Wood, Jr.
Assistant Examiner—Howard Beltran
Attorney, Agent, or Firm—Ernest F. Marmorek

[57] ABSTRACT

The damped pivot for high-speed rotating machines and especially ultracentrifuges comprises in combination a bearing subjected to an elastic-restoring and centering member, a film of fluid under pressure within the clearance formed between a bore of the bearing and a bearing shaft for guiding the pivot, a base with a damping chamber for containing the bearing and a contiguous feed chamber, said chambers being intended to communicate with each other, pressure-fluid ducts formed in the bearing in order to establish a communication between the clearance and the feed chamber.

10 Claims, 3 Drawing Figures

DAMPENED VERTICAL SPINDLE

This invention relates to a damped pivot for machines which rotate at high velocities and especially for ultracentrifuges.

In this type of rotating machine having a vertical axis of rotation, the radial stresses on the bearing arise essentially from the unbalance of the rotor. These stresses are liable to be considerable in the case of rigid bearings and a rotor which is caused by these latter to rotate on an axis which is different from the principal axis of inertia, but become of very low value when the body of the bearing is joined to the casing by means of a suitably selected spring and damping system. A small mass can then be associated with the bearing, thus permitting an appreciable delay in the initiation of the half-velocity vortex and the use of small-sized bearings which limit the losses caused by viscous friction to relatively low values.

The invention essentially consists in providing a damped pivot which is characterized in that it comprises in combination:
— a bearing subjected to an elastic-restoring and centering member,
— a fluid film under pressure within the clearance formed between a bore of the bearing and a bearing shaft for guiding the pivot,
— a base with a damping chamber for containing the bearing and a contiguous feed chamber, said chambers being intended to communicate with each other,
— pressure-fluid ducts formed in the bearing in order to establish a communication between said clearance and the feed chamber.

The guide-shaft of the pivot is cylindrical and rotates within a bore of the bearing while one radial face of said shaft is in floating suspension. The cylindrical guide-shaft can be replaced by a conical shaft. In this case, the angle of cone is judiciously chosen so as to reconcile the load-carrying capacity with optimum centering.

In accordance with a further aspect of the invention, a labyrinth seal of the bearing is cooled so as to condense within the casing the projections of fluid which penetrate within said seal.

The following description relates to examples of construction which are described with reference to the accompanying drawings, wherein.

Figure 1:
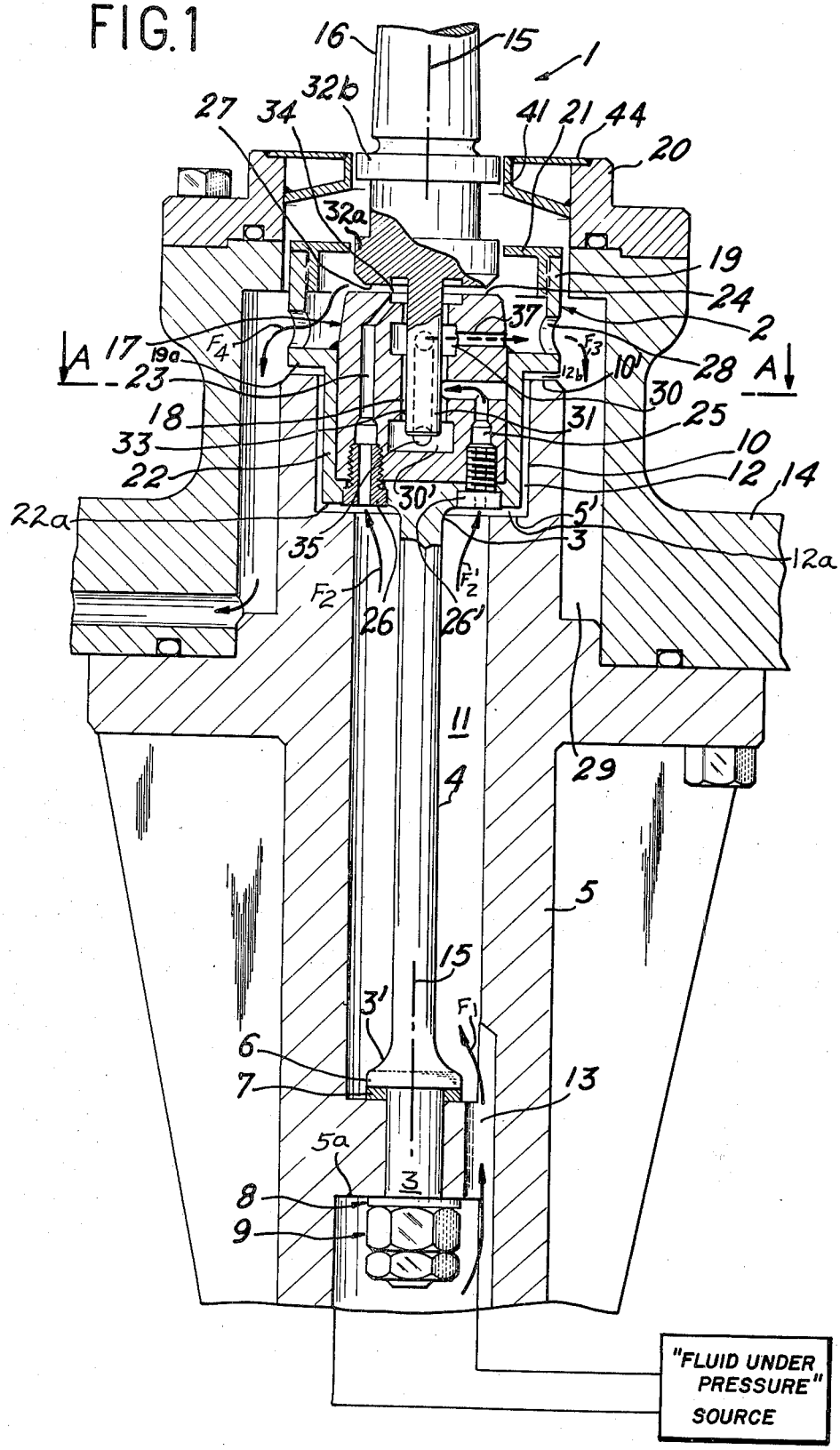
FIG. 1 is a sectional view in elevation showing the damped pivot in accordance with the invention.

In FIG. 1, a damped pivot 1 which forms the downward extension of a rotor (not shown in the drawings) is mounted in a free bearing 2, said bearing being secured to one extremity 3 of a flexible spindle 4, the other extremity 3' of which is fixed in a stationary support 5a within a base 5. In the example at present considered, the fixed extremity 3' is retained on one side by means of an annular shoulder 6 of the spindle which is applied against at least one washer 7 of calibrated thickness and on the other side by means of conventional locking means such as washers 8 and nuts 9. The calibrated washer 7 serves to adjust the position of the flexible spindle 4 and this latter works in the same manner as a vertical beam which is fixed at one end.

The bearing 2 is contained within a damping chamber 10 which forms an extension of the base 5 and the flexible spindle 4 extends into a feed chamber 11; the two chambers are contiguous and communicate with each other. The respective diameters of the damping chamber 10 and of the bearing 2 leave a running clearance 12, the design function of which will be described hereinafter. At least one orifice 13 establishes a communication between the feed chamber 11 and an external pressure-fluid pipe (not shown in the drawings).

Figure 2:
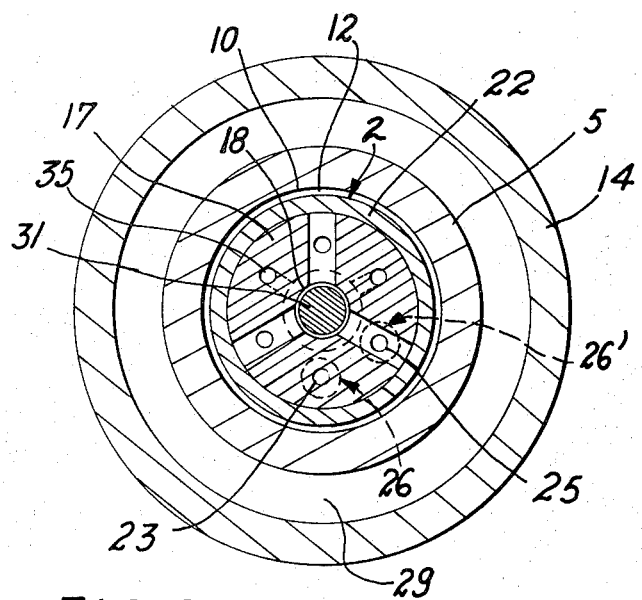
FIG. 2 is a sectional plan view taken along line A—A of FIG. 1.

As illustrated in FIGS. 1 and 2, the damped bearing 2 is composed of a central body 17 with a cylindrical bore 18 and an annular collector 19 which is closed by a flanged member 21. The bore 18 and the orifice of the end-piece 20 are centered on the axis 15 which is common to the pivot 1 and to the flexible spindle 4. For convenience of construction, the central body 17 is forcibly fitted within a sleeve 22 which is rigidly fixed to the annular collector 19 and to the spindle 4, the assembly being formed by means of a process such as brazing, for example. Separate machining of the different components can also be contemplated without thereby modifying the scope of the invention.

Within the central body 17, a first duct 23 puts the feed chamber 11 into communication with the upper radial face 24 of the bearing; a second set of three ducts 25 provides a communication between said chamber and the center of the bore 18 comprising annular chambers 30, 30'. Nozzles 26, 26' are mounted at the inlets of the sets of ducts 23–25 and communicate directly with the feed chamber 11.

The annular collector 19 has a larger diameter than the central body 17 at the level of the radial lifting surface 24 and is pierced by peripheral orifices 28 which communicate with the recovery space 29 of the casing 14. Said collector receives the fluid in the expanded state which is derived in particular from the passageways 35 (FIG. 2) and 37 (FIG. 1) formed in the central body 17 and extending from the annular chambers 30 and 30'.

The pivot 1 is provided with a cylindrical axial bearing guide-shaft 31 and with two annular shoulders. A first annular shoulder 32a which is adjacent to the guide-shaft 31 serves as a lifting surface 27 and cooperates with the flanged member 21 in order to provide a first fluid-tight shaft seal without any contact between the two components. The second annular shoulder 32b is the rotating element of a labyrinth seal as will be explained later. The coupling profile 16 shown in FIG. 1 is conical; however, this shape is given by way of example and is dependent on the rotor which is set in rotation by means of an external motion-transmission system and the characteristics of which do not form part of this invention.

Centering and lifting of the pivot 1 by means of the bearing 2 are carried out by means of fluid films which circulate within the axial and radial clearances 33 and 34 respectively, the axial clearance being formed between the bore 18 and the guide shaft 31 whilst the radial clearance is formed between the radial face 24 and the lifting surface 27. The films are maintained by the pressure of fluid which is introduced through the ducts 23, 25 described in the foregoing. The running clearance 12 is filled under pressure with the same fluid which is supplied from the chamber 11 through a small clearance 12a formed between the radial face 5' of the base and the lower face 22a of the sleeve 22, said fluid being discharged through a second clearance 12b formed between the radial face 10' of the base and the annular shoulder 19a of the collector 19. These clearances limit the chamber 12 while permitting displacement of the bearing 2. The second clearance 12b is equal to or smaller than the first in order to obtain a high pressure within the feed chamber. Said clearances can be adjusted simultaneously by selecting a suitable thickness of the washer 7.

Figure 3:
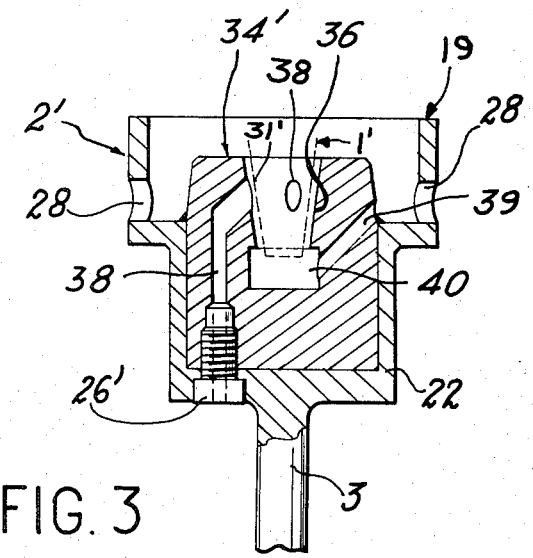
FIG. 3 is an alternative embodiment of the invention.

In an alternative embodiment of the invention which is illustrated in FIG. 3, the cylindrical bore of the bearing 2' (bearing 2 in FIG. 1) is replaced by a conical bore 36 and an expansion chamber 40 is placed beneath the smallest diameter of the bore and forms a thrust bearing. Fluid ducts 38 serve to supply the bore 36 at the mid-point of its length. At least one duct 39 discharges the fluid from the chamber 40 towards the collector 19.

Centering and damping of the conical guide-shaft bearing 36 for the pivot 1' (dotted line) with conical guide-shaft 31' can be carried out in the same manner as in the case of the cylindrical guide-shaft pivot of FIGS. 1 and 2.

Fluid-tightness of the pivot 1 is improved as shown in FIG. 1 by means of a cover 44 which is placed over the end-plate 2 of the casing 14. Said cover is provided with a bore 41 representing the stationary element which cooperates with the rotating annular shoulder 32b mentioned earlier in order to form a labyrinth seal of a type known per se. The stationary cover 44 is cooled so as to condense the vapors of lubricant which infiltrate in the seal and in order to maintain a vacuum within this latter in the event that the rotor rotates in a vacuum.

The operation of the damped bearing 2 in accordance with the invention is as follows: the path of the fluid under pressure is shown in FIG. 1 by the arrows $F_1$, $F_2$, $F_3$, and $F_4$, which fluid is supplied from the feed chamber 11 to be admitted in parallel on the one hand into the running clearance 12 and on the other hand into the axial clearance 33 and radial clearance 34 or alternatively into the single conical clearance in the case of FIG. 3. Said fluid escapes through the orifices 28 into the recovery space 29 of the casing 14.

The films of fluid under pressure in the clearances 33–34 have the effect of guiding and lifting pivot 16. Radial stresses arising from very low degrees of unbalance and from half-velocity vortices are also damped by the fluid film within the running clearance 12 supplied and discharged by radial clearances 12a, 12b. The viscosity of the fluid therefore plays an important part and must be greater as the clearance itself is larger. The fluid can be chosen from the lubricants and must be of the low vapor-tension type if the rotor is intended to operate in a low-pressure environment or in a vacuum.

As a result of laminar friction between the pivot 16 and the bearing 2, the fluid becomes heated and has a tendency to vaporize. The emulsion thus produced is discharged through the orifices 28 and collected in the recovery space 29 whilst the vapors which infiltrate through the profiles 32, 41 of the labyrinth seal are condensed by the cooled cover 44 and subsequently removed.

What we claim is:

1. A damped pivot for machines which rotate at high velocities, wherein said pivot comprises in combination:

a bearing, an elastic restoring and centering member acting on said bearing to support elastically and acting to restore to center said bearing during operation, said bearing comprising a shaft and defining a bearing bore, said shaft being disposed in said bearing bore with a clearance;

a film of fluid under pressure, provided in said clearance to guide and damp the pivot;

a casing means including a base and surrounding said bearing, said base defining a damping chamber, a contiguous feed chamber, and pressure fluid ducts interconnecting said chambers.

2. A pivot according to claim 1, wherein the bore is cylindrical.

3. A pivot according to claim 1, wherein the bore is conical.

4. A pivot according to claim 1 wherein said casing defines a casing bore, and said pivot includes annular shoulder which forms a labyrinth seal for said casing bore.

5. A pivot according to claim 4, wherein the labyrinth seal is cooled so that any vapors of the fluid which penetrate into said seal condense within the casing.

6. A pivot according to claim 1, further comprising a thrust bearing supplied with fluid under pressure whereby it acts to compensate for thrust exerted by the pivot.

7. A pivot according to claim 1, said bearing further comprising an annular collector disposed in the upper end of said bearing whereby fluid passing through said bearing is collected, and being provided with peripheral orifices for discharging collected fluid.

8. A pivot according to claim 7 further comprising:

a recovery space to contain recovered fluid and said bearing being disposed in said damping chamber with a damping chamber annular clearance defined between said damping chamber and said bearing and intercommunicating with said collector peripheral orifices and with said recovery space whereby discharged fluid from said collector may flow to said recovery space.

9. A pivot according to claim 1, said elastic restoring and centering member comprising a flexible spindle centrally disposed in said casing, said flexible spindle being secured to said bearing near one extremity and to said casing means near the other extremity whereby said bearing is elastically supported with respect to said casing along the mean axis of rotation of said pivot.

10. A pivot according to claim 9, further comprising an annular collector disposed in the upper end of said bearing to collect fluid passing through said bearing, and wherein said feed chamber, said bearing, said annular collector, and said damping chamber are disposed concentrically about the mean axis of rotation of said pivot.

\* \* \* \* \*